(12) United States Patent
Takahashi et al.

(10) Patent No.: US 10,618,170 B2
(45) Date of Patent: Apr. 14, 2020

(54) ROBOT SYSTEM

(71) Applicant: FANUC CORPORATION, Yamanashi (JP)

(72) Inventors: Yuuki Takahashi, Yamanashi (JP); Atsushi Watanabe, Yamanashi (JP); Minoru Nakamura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 178 days.

(21) Appl. No.: 15/868,754

(22) Filed: Jan. 11, 2018

(65) Prior Publication Data

US 2018/0236665 A1 Aug. 23, 2018

(30) Foreign Application Priority Data

Feb. 17, 2017 (JP) .................................. 2017-027984

(51) Int. Cl.
*G06T 7/00* (2017.01)
*B25J 9/16* (2006.01)

(52) U.S. Cl.
CPC ........... *B25J 9/1674* (2013.01); *B25J 9/1651* (2013.01); *B25J 9/1666* (2013.01); *B25J 9/1697* (2013.01);
(Continued)

(58) Field of Classification Search
CPC ........ B25J 9/1697; B25J 9/1651; B25J 9/023; B25J 9/1656; B25J 9/1676; B25J 19/023;
(Continued)

(56) References Cited

U.S. PATENT DOCUMENTS

2002/0186299 A1* 12/2002 Cofer .................... F16P 3/142
348/152
2003/0076224 A1 4/2003 Braune
(Continued)

FOREIGN PATENT DOCUMENTS

CN 1538355 A 10/2004
CN 104039513 A 9/2014
(Continued)

OTHER PUBLICATIONS

Chinese Office Action dated May 8, 2019, for Chinese Patent Application No. 201810148563.3.
(Continued)

*Primary Examiner* — Dalena Tran
(74) *Attorney, Agent, or Firm* — Karceski IP Law, PLLC

(57) ABSTRACT

A robot system includes a robot installed such that the working space thereof is within a first area, an image acquisition unit that sequentially acquires images of the vicinity of a boundary of the first area and a second area that are adjacent to each other with the boundary therebetween, a monitoring-area setting unit that sets a monitoring area in a space adjacent to the boundary in the second area in the images acquired by the image acquisition unit, an object detecting unit that detects a moving object in the monitoring area set by the monitoring-area setting unit by processing the images acquired by the image acquisition unit, and a controller that performs control so as to restrict the operation of the robot when the moving object is detected by the object detecting unit.

7 Claims, 8 Drawing Sheets

(52) U.S. Cl.
CPC .............. *G05B 2219/40202* (2013.01); *G05B 2219/40203* (2013.01)

(58) Field of Classification Search
CPC .......... G05B 2219/40203; G05B 2219/40202; G05B 19/0429; G05B 19/4061; G05B 2219/375567; G05B 2219/39088; G05B 2219/40409; F16P 3/142; F16P 3/144
USPC .................... 700/253; 701/26; 382/103, 173
See application file for complete search history.

(56) References Cited

U.S. PATENT DOCUMENTS

| | | |
|---|---|---|
| 2004/0227816 A1 | 11/2004 | Sato et al. |
| 2010/0191372 A1 | 7/2010 | Neihi et al. |
| 2012/0327190 A1* | 12/2012 | Massanell ............. B25J 9/1676 348/46 |
| 2014/0207285 A1 | 7/2014 | Sakabe |
| 2015/0006240 A1 | 1/2015 | Kanamaru et al. |
| 2015/0217455 A1 | 8/2015 | Kikkeri et al. |
| 2016/0040827 A1 | 2/2016 | Merx |

FOREIGN PATENT DOCUMENTS

| | | |
|---|---|---|
| CN | 105247268 A | 1/2016 |
| EP | 1457730 A2 | 9/2004 |
| JP | 2003222295 A | 8/2003 |
| JP | 2004276154 A | 10/2004 |
| JP | 2009545457 A | 12/2009 |
| JP | 2010120139 A | 6/2010 |
| JP | 2010188515 A | 9/2010 |
| JP | 2010208002 A | 9/2010 |
| JP | 2013010161 | 1/2013 |
| JP | 2014140920 A | 8/2014 |
| JP | 2015066664 | 4/2015 |

OTHER PUBLICATIONS

Japanese Office Action dated Sep. 11, 2018, for Japanese Patent Application No. 2017-027984.

Japanese Search Report by Registered Search Organization dated Sep. 11, 2018, for Japanese Patent Application No. 2017-027984.

\* cited by examiner

ROBOT SYSTEM

CROSS-REFERENCE TO RELATED APPLICATIONS

This application is based on and claims priority to Japanese Patent Application No. 2017-027984, filed on Feb. 17, 2017, the entire content of which is incorporated herein by reference.

FIELD OF THE INVENTION

The present invention relates to a robot system.

BACKGROUND OF THE INVENTION

In a known robot system in the related art, an area in which a robot is located and an area in which an operator exists are divided by forming a planar optical partition with a light curtain or a laser scanner, and the entry of the operator or the robot from one area to the other area is detected when an object crosses the partition (for example, see Japanese Unexamined Patent Application Publication No. 2015-66664).

SUMMARY OF THE INVENTION

The present invention provides the following solutions.

An aspect of the present invention is a robot system including: a robot installed such that the working space thereof is within a first area; an image acquisition unit that sequentially acquires images of the vicinity of a boundary of the first area and a second area that are adjacent to each other with the boundary therebetween; a monitoring-area setting unit that sets, in the images acquired by the image acquisition unit, a monitoring area in a space in the second area adjacent to the boundary; an object detecting unit that detects a moving object in the monitoring area set by the monitoring-area setting unit by processing the images acquired by the image acquisition unit; and a controller that performs control so as to restrict the operation of the robot when the moving object is detected by the object detecting unit.

DESCRIPTION OF EMBODIMENTS OF THE INVENTION

A robot system 1 according to an embodiment of the present invention will be described below with reference to the drawings.

Figure 1:
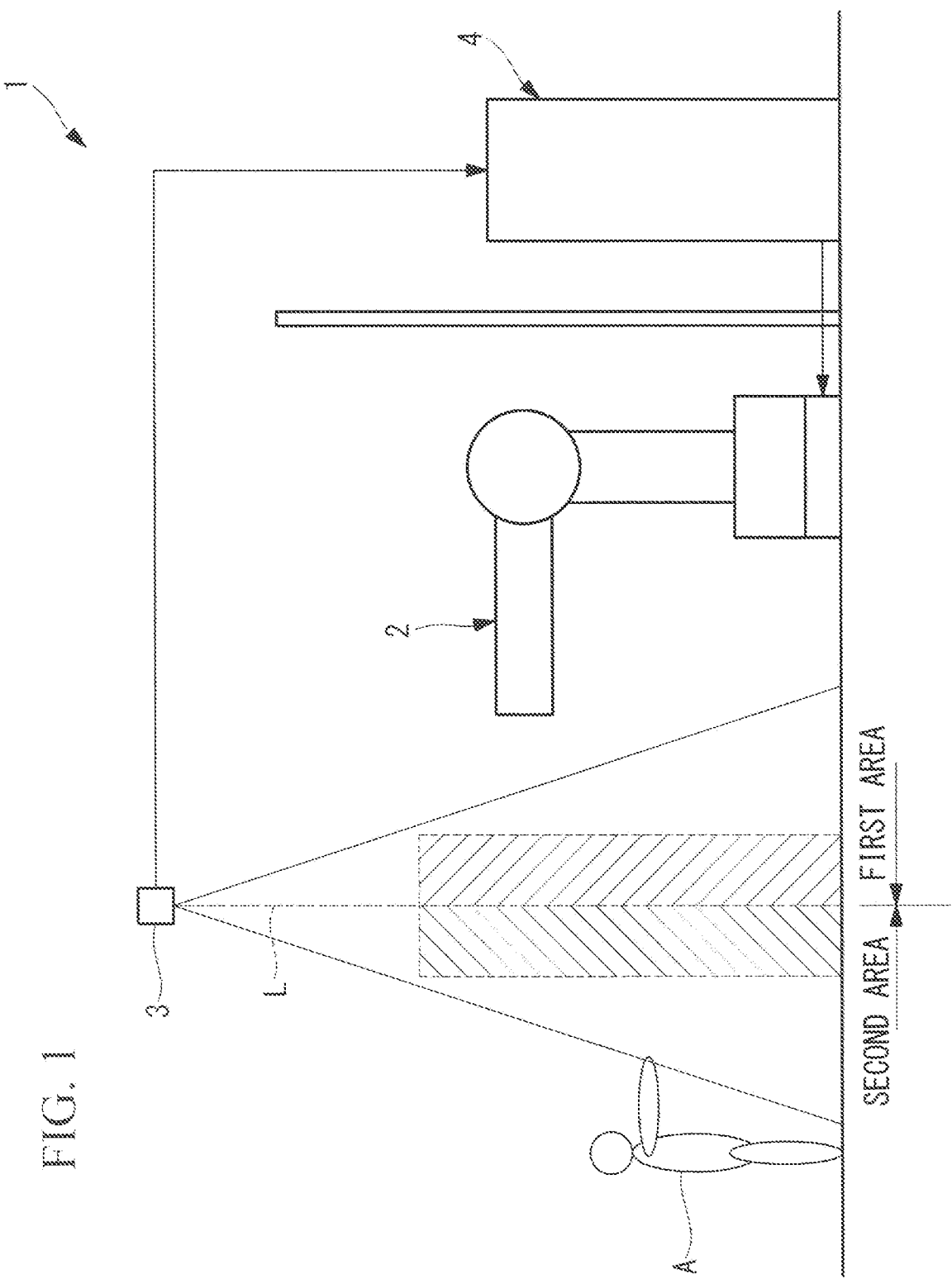
FIG. 1 is a front view showing a robot system according to an embodiment of the present invention.
Figure 2:
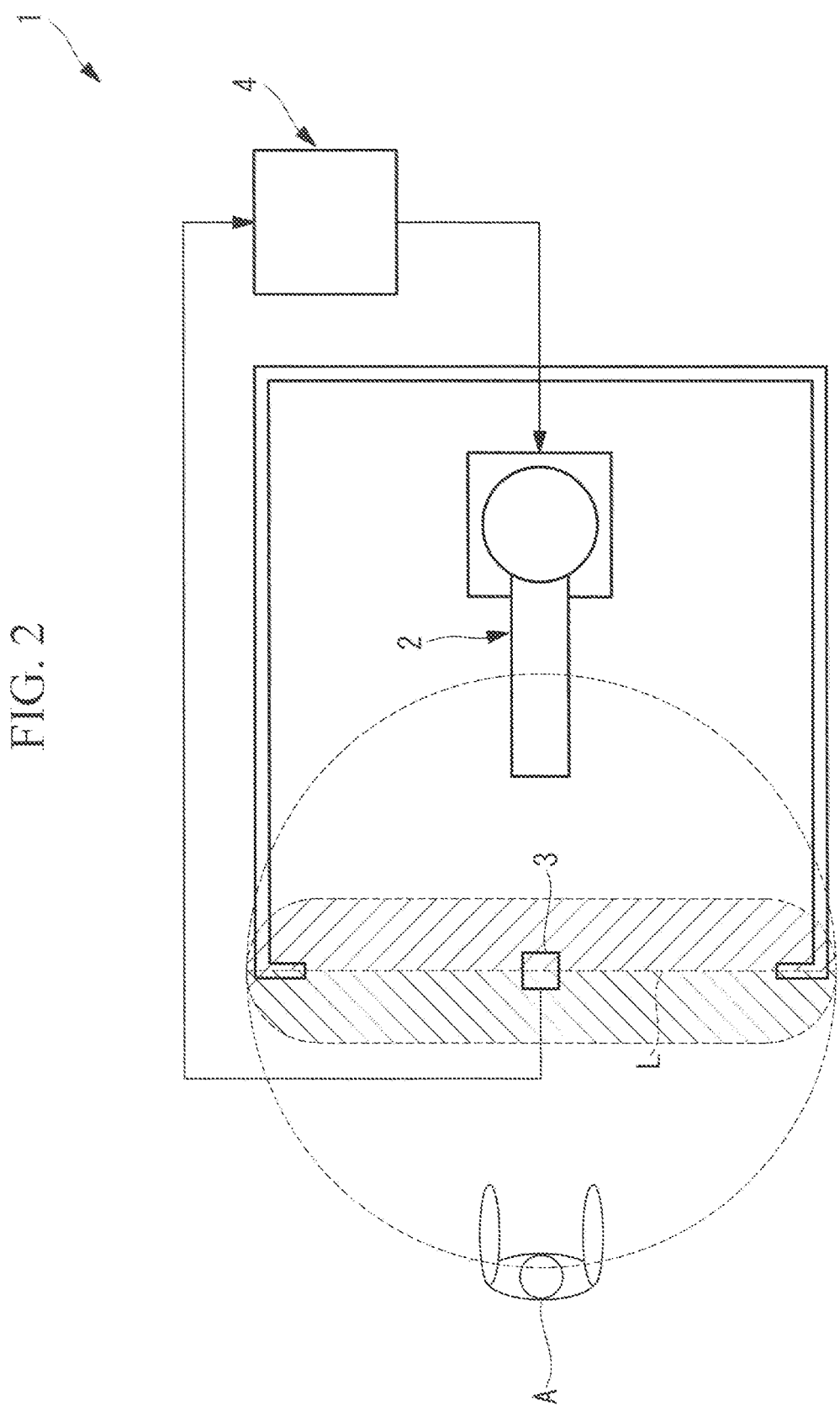
FIG. 2 is a plan view of the robot system in FIG. 1.

As shown in FIGS. 1 and 2, the robot system 1 according to this embodiment includes a robot 2 installed in a first area, a downwardly facing three-dimensional camera (image acquisition unit) 3 that is disposed vertically above a boundary L between a first area and a second area adjacent to the first area, and a control unit 4 that controls the robot 2 based on three-dimensional images acquired by the three-dimensional camera 3.

The robot 2 has a working space (more specifically, a space smaller than the maximum movable space of the robot 2 because of the operation restriction or the like) in the first area and is configured to be operable only within the first area. Herein, the robot 2 includes not only the mechanical parts of the robot 2, but also a tool attached to the wrist of the robot 2 and a workpiece transported by the tool. In short, the robot 2 is installed such that it, including the workpiece, can operate only within the first area.

The three-dimensional camera 3 is located at a position at which the entirety of the boundary L, which can be crossed by an operator A or a moving robot moving in the second area, and at least portions of the first area and the second area adjacent to the boundary L are in the field of view thereof. The three-dimensional camera 3 is configured to sequentially acquire three-dimensional images in the field of view thereof, and can monitor an object in the field of view thereof to detect the three-dimensional position thereof.

Figure 3:
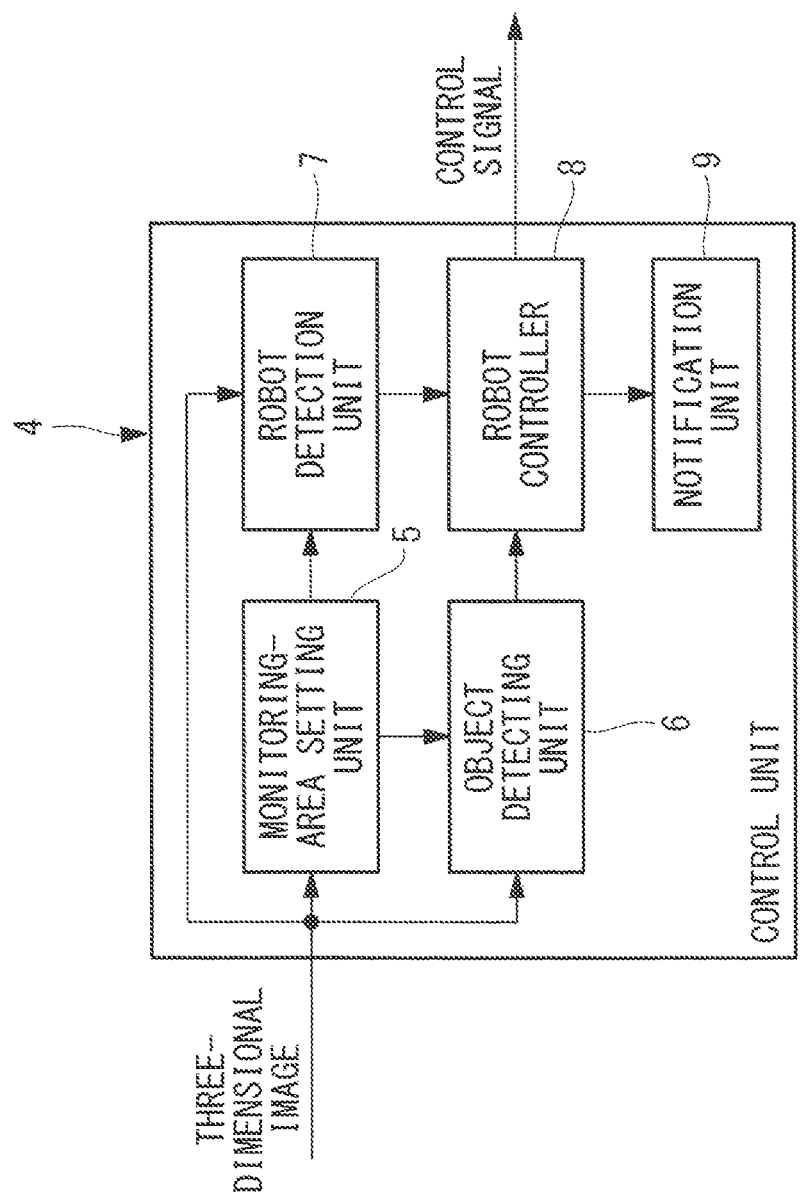
FIG. 3 is a block diagram showing a control unit provided in the robot system in FIG. 1.

As shown in FIG. 3, the control unit 4 includes: a monitoring-area setting unit 5 that sets monitoring areas (hatched portions in FIG. 3) in spaces in the first area and the second area adjacent to the boundary L based on the three-dimensional images acquired by the three-dimensional camera 3; an object detecting unit 6 that processes the three-dimensional images and detects the presence/absence of an object in the monitoring area set in the second area; a robot detection unit 7 that processes the three-dimensional images and detects the presence/absence of the robot 2 in the monitoring area set in the first area; a robot controller (controller) 8 that controls the robot 2 so as to restrict the operation thereof based on the results of the detection by the object detecting unit 6 and the robot detection unit 7; and a notifying unit 9 that issues a notification of the results of the detection.

As shown in FIG. 1, in this embodiment, the monitoring-area setting unit 5 sets, as the monitoring areas, a space between parallel planes that are located at a predetermined distance away from the vertically extending planar boundary L to the first area side and to the second area side. The second-area-side monitoring area is set to be equal to the distance the moving object moves, which is calculated by multiplying the time needed to complete the operation restriction after the operation restriction of the robot 2 by the robot controller 8 is started by the moving speed of the moving object, such as the operator A, moving in the second area side. The moving distance is preliminarily stored in the monitoring-area setting unit 5. Furthermore, the moving speed may be the expected maximum speed of the moving object.

For example, the operation restriction of the robot 2 by the robot controller 8 includes stopping the operation of the robot 2 and slowing down the robot 2. This way, by starting the operation restriction by the robot controller 8 upon detection of the entry of a moving object into the second-area-side monitoring area, it is possible to prevent the moving object from crossing the boundary L before the operation restriction of the robot 2 is completed.

The first-area-side monitoring area only needs to have a distance greater than or equal to the preset safety distance.

The safety distance for setting the first-area-side monitoring area is also preliminarily stored in the monitoring-area setting unit 5.

The robot controller 8 performs control so as to start the operation restriction of the robot 2 when the robot 2 is detected in the monitoring area in the first area by the robot detection unit 7 at the time when the moving object is detected in the monitoring area in the second area by the object detecting unit 6.

When the robot controller 8 starts the operation restriction of the robot 2, the notifying unit 9 issues a notification to that effect. More specifically, a status indicator lamp is turned on.

The operation of the thus-configured robot system 1 according to this embodiment will be described below.

Figure 4:
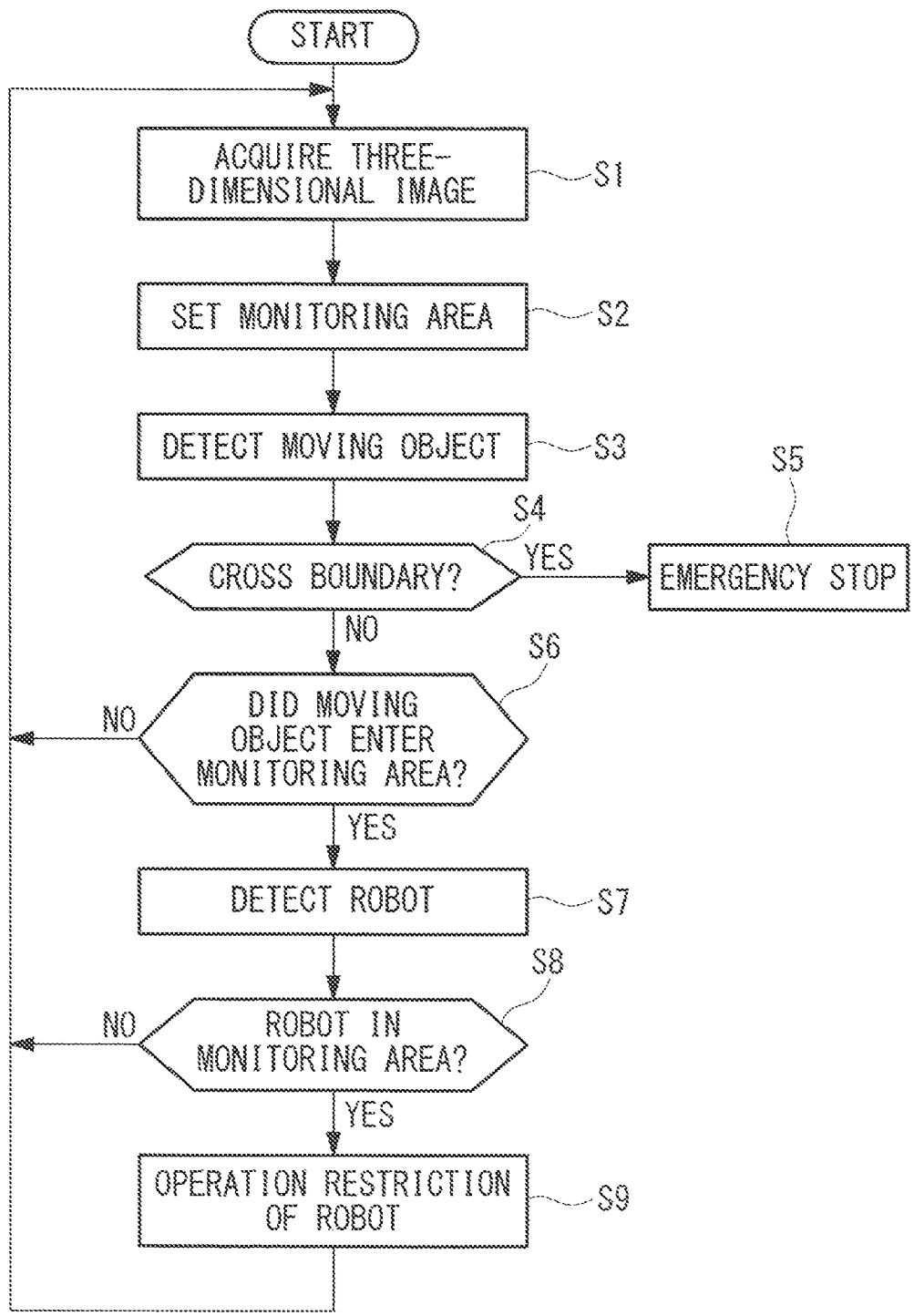
FIG. 4 is a flowchart showing the operation of the robot system in FIG. 1.

As shown in FIG. 4, in the robot system 1 according to this embodiment, three-dimensional images are sequentially acquired by the three-dimensional camera 3 (step S1), the acquired three-dimensional images are sent to the monitoring-area setting unit 5 of the control unit 4, and monitoring areas are set in the first area and the second area, in the vicinity of the boundary L (step S2).

Once the monitoring areas are set, the three-dimensional images are processed by the object detecting unit 6 to detect the moving object in the monitoring area (step S3). The robot controller 8 determines whether the detected moving object has crossed the boundary L (step S4), and, if it has crossed the boundary L, the robot 2 is brought to an emergency stop (step S5). When the detected moving object has not crossed the boundary L, it is determined whether it is in the monitoring area (step S6), and when it is in the monitoring area, the robot detection unit 7 performs detection of the robot 2 (step S7), and the robot controller 8 determines whether the robot 2 is in the monitoring area (step S8).

When the robot 2 is in the monitoring area, the operation restriction to slow down or to stop the robot 2 is performed (step S9). When it is determined that the moving object is not in the monitoring area in step S6, and when it is determined that the robot 2 is not in the monitoring area in step S8, the process from step S1 is repeated.

In the thus-configured robot system 1 according to this embodiment, the monitoring area in the second area, in which the moving object, such as the operator A, is moving, is set over a predetermined area from the boundary L with respect to the first area, and the operation of the robot 2 in the first area is restricted as a result of the entry of the moving object in the monitoring area. Hence, in the installation of the robot 2, the working space of the robot 2 does not need to be set away from the boundary L with respect to the second area.

In other words, because the operation restriction of the robot 2 is started when the entry of the moving object into the second-area-side monitoring area is detected, the moving object does not cross the boundary L before the operation restriction of the robot 2 is completed, leading to an advantage in that contact between the robot 2 and the moving object can be reliably avoided although the working space of the robot 2 is set very close to the boundary L between the first area and the second area. This results in an advantage in that the installation space for the robot 2 can be minimized.

In the above configuration, although there is no problem in the case where no monitoring area is set on the first area side, in the system having steps S8 and S9, the operation restriction of the robot 2 is not yet completed when the moving object has crossed the boundary L. This is because the robot 2 is not detected in the first-area-side monitoring area.

Figure 5:
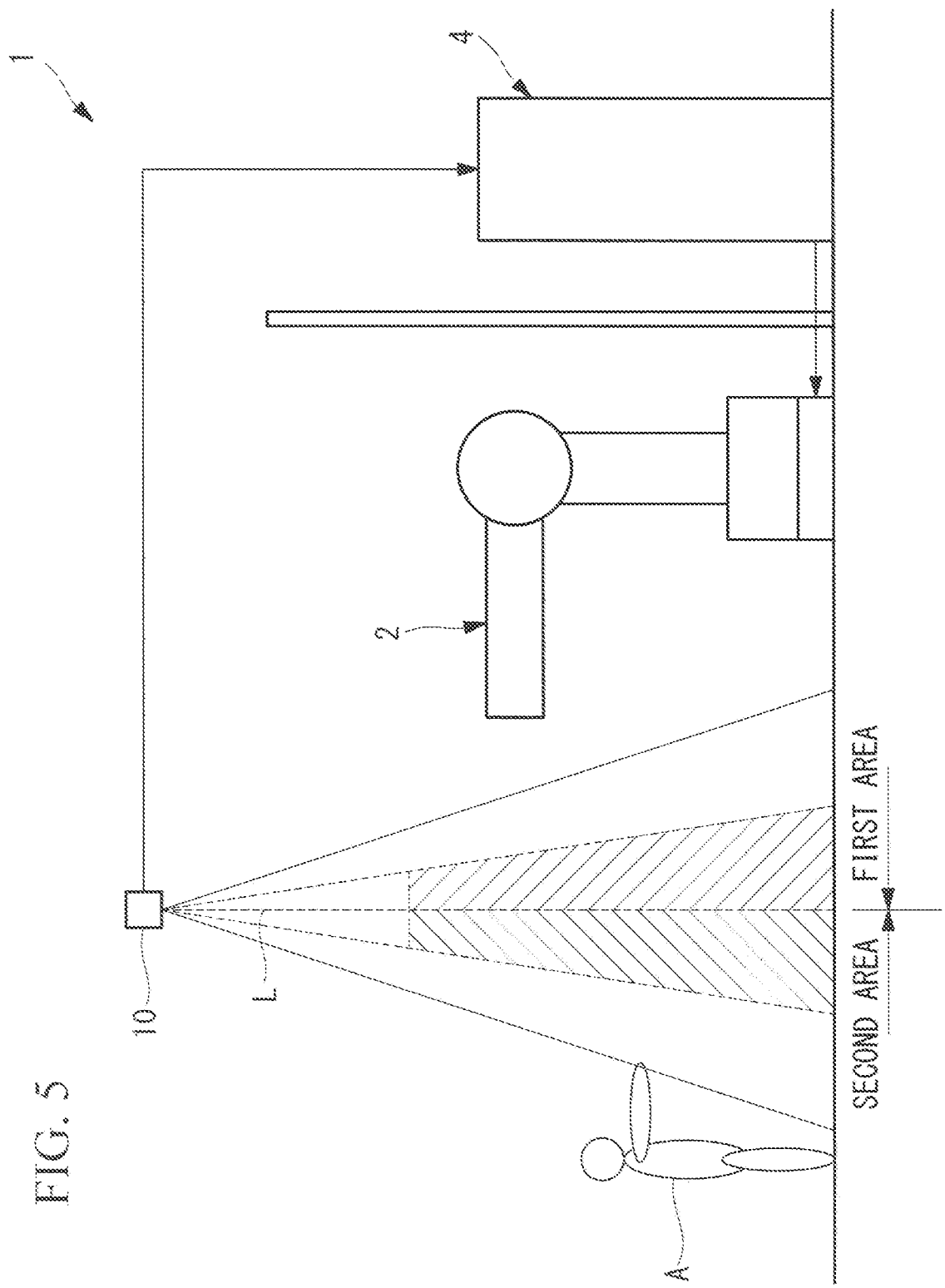
FIG. 5 is a front view showing a first modification of the robot system in FIG. 1.

This embodiment also has an advantage in that, because the three-dimensional camera 3 that acquires three-dimensional images is employed as the image acquisition unit, it is possible to ascertain the three-dimensional position of the moving object to set proper monitoring areas. Specifically, as shown in FIG. 5, when two-dimensional images are acquired with a two-dimensional camera 10 to set monitoring areas, due to the field-of-view angle, monitoring areas that are wider at a position farther from the two-dimensional camera 10 are generated.

Thus, the monitoring areas are narrow at the upper part, which is close to the two-dimensional camera 10, and the monitoring areas are wide at the lower part, which is far from the two-dimensional camera 10. Because the moving speed of the moving object is the same in the upper part and in the lower part, if sufficient monitoring areas are to be ensured in the upper part, the monitoring areas at the lower part are inefficiently large, which is disadvantageous.

In contrast, in this embodiment, by acquiring three-dimensional images, it is possible to set monitoring areas having a uniform horizontal distance from the boundary L over the overall length in the height direction. This leads to an advantage in that it is possible to perform uniform monitoring at any position in the height direction.

Furthermore, in this embodiment, because the monitoring area is set by the monitoring-area setting unit 5 also on the first area side, on which the robot 2 is installed, to perform the operation restriction of the robot 2 when the robot 2 is in the monitoring area, the operation of the robot 2 is not restricted when it is not in the monitoring area. Thus, there is an advantage in that, compared with a case where the operation is restricted whenever the moving object is detected in the second-area-side monitoring area, the operation efficiency can be improved because the operation of the robot 2 is not restricted when the possibility of contact with the moving object is low.

In this embodiment, although the case where the three-dimensional camera 3 is employed as the image acquisition unit has been described, instead, the two-dimensional camera 10 may be employed.

Figure 6:
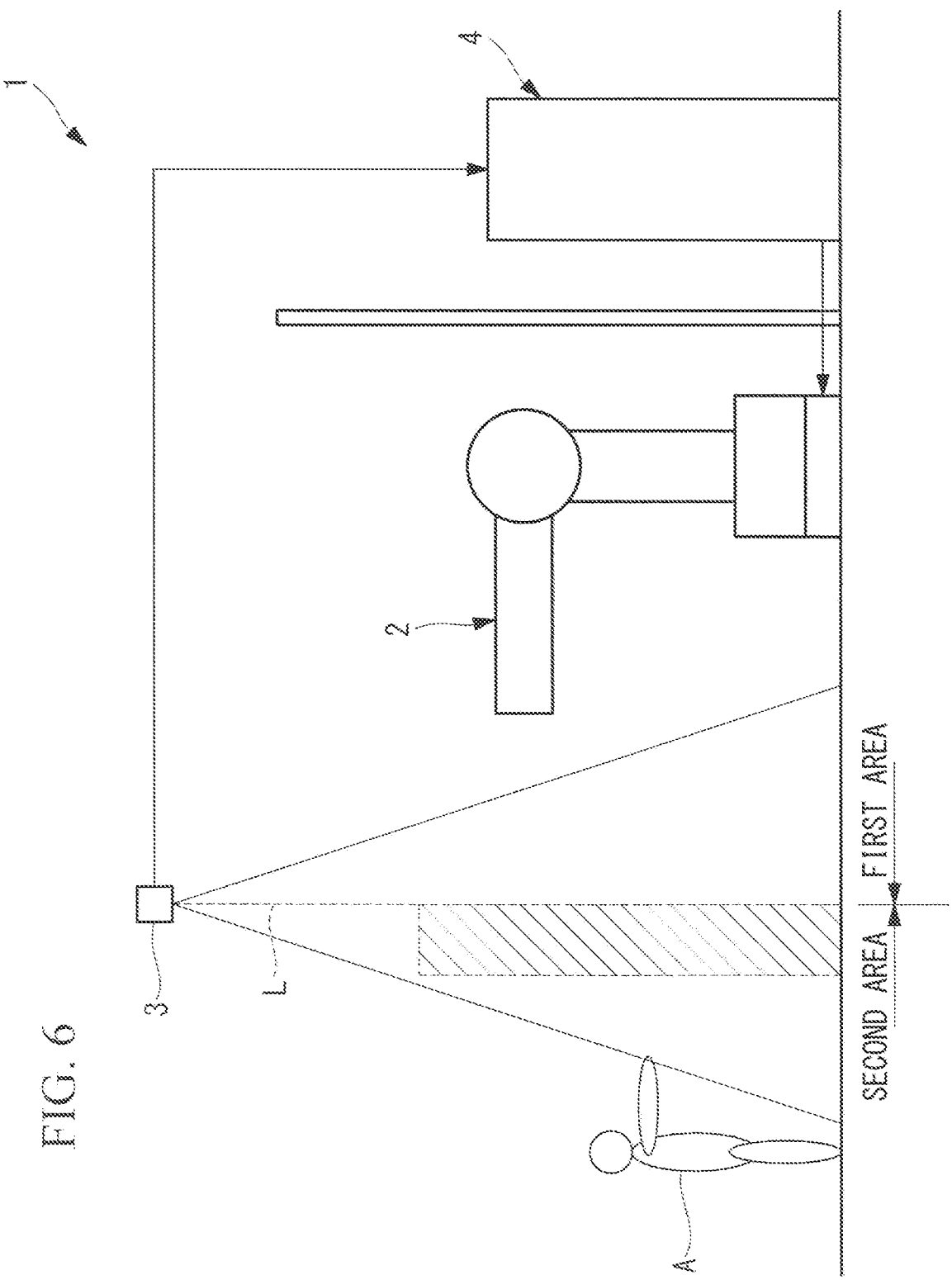
FIG. 6 is a front view showing a second modification of the robot system in FIG. 1.

Furthermore, although the monitoring area is set also on the first area side to restrict the operation when the robot 2 is in the monitoring area, instead, as shown in FIG. 6, it is also possible to restrict the operation of the robot 2 whenever the moving object is detected in the second-area-side monitoring area, without setting the monitoring area on the first area side.

Furthermore, in this embodiment, although an area from the boundary L to a position away therefrom by a preliminarily stored distance is set as the monitoring area in the first area, instead, the monitoring-area setting unit 5 may generate and set the monitoring area in the first area based on the three-dimensional position and distance the moving object moving in the second area.

Figure 7:
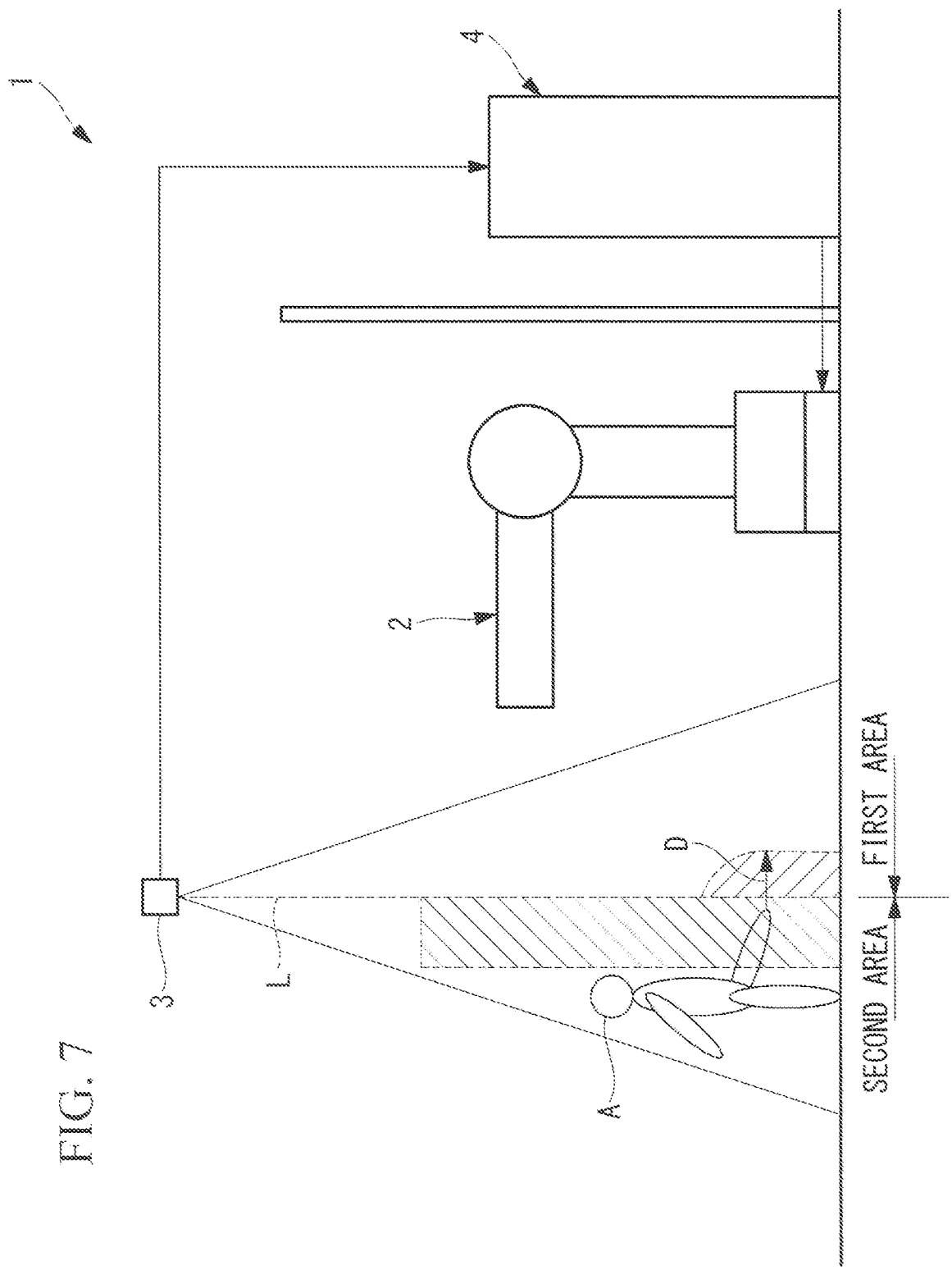
FIG. 7 is a front view showing a third modification of the robot system in FIG. 1.

More specifically, as shown in FIG. 6, when the moving object in the second area is not in the monitoring area, the monitoring area is not set in the first area side, whereas, as shown in FIG. 7, when the moving object has entered the monitoring area, a first-area-side monitoring area is generated at a position offset from the three-dimensional position of the surface of the moving object by the distance the moving object moves, which is the product of the time needed for the operation restriction of the robot 2 and the moving speed of the moving object.

This configuration provides an advantage in that it is possible to minimize the monitoring area based on which the operation restriction of the robot 2 is performed, thus further improving the operation efficiency.

More specifically, in the example shown in FIG. 7, because a foot of the operator A has entered the lower side of the second-area monitoring area, a monitoring area offset from the surface of the foot by a moving distance D is generated only on the lower side of the first area. In the lower side portion where the foot approaches the boundary L, the possibility of contact with the robot 2 is high, and thus, the monitoring area based on which the operation restriction of the robot 2 is performed is set, whereas, in the upper side portion where the possibility of contact is low, the monitoring area is not set, and thus, the operation of the robot 2 is not restricted.

Figure 8:
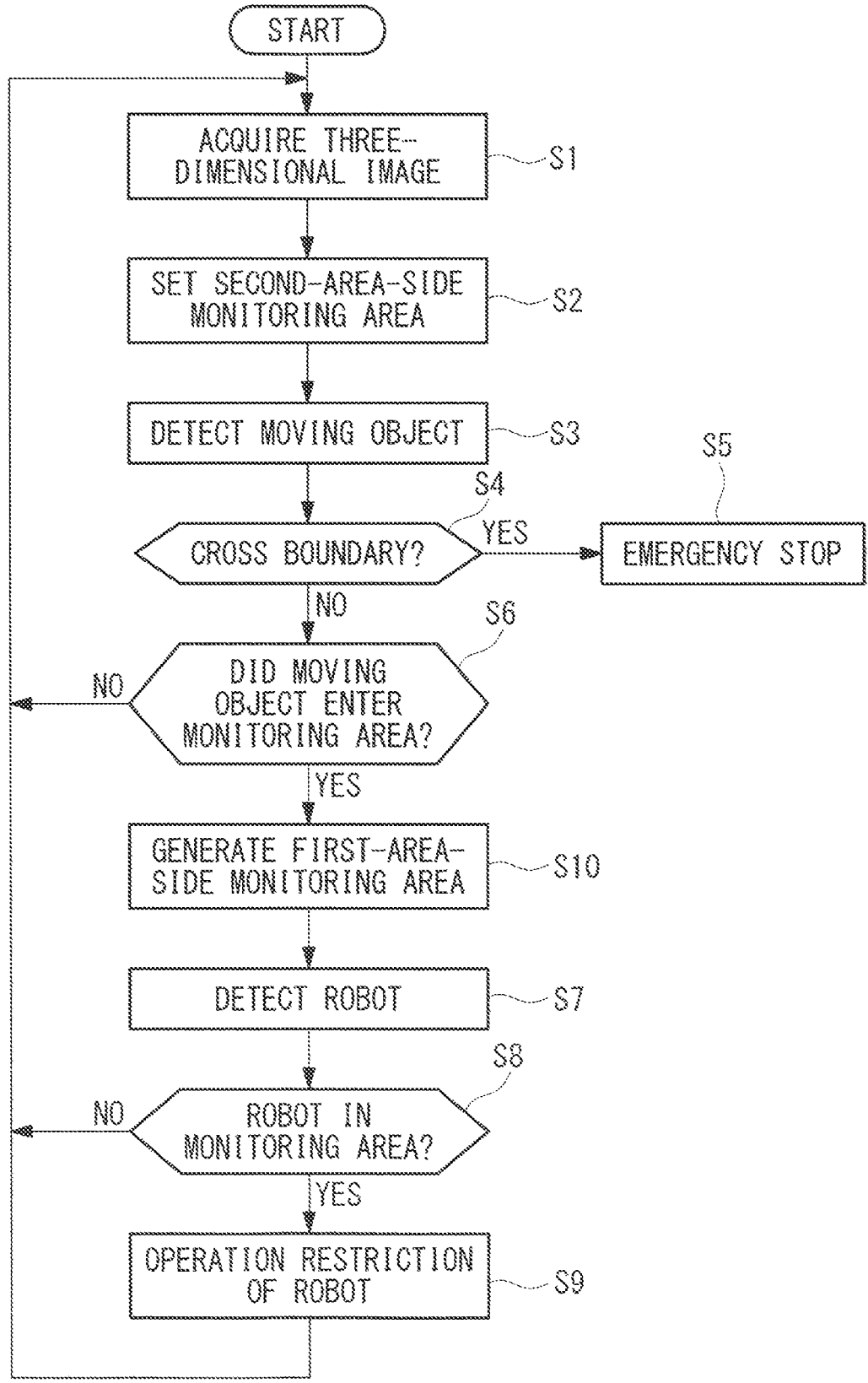
FIG. 8 is a flowchart showing the operation of the robot system in FIG. 7.

In this case, as shown in FIG. 8, only the monitoring area in the second area is set in step S2, and the monitoring area in the first area is generated as a result of the moving object being detected in the second-area-side monitoring area (step S10), which differs from the process in FIG. 4.

As a result, the above-described embodiment leads to the following aspect.

An aspect of the present invention is a robot system including: a robot installed such that the working space thereof is within a first area; an image acquisition unit that sequentially acquires images of the vicinity of a boundary of the first area and a second area that are adjacent to each other with the boundary therebetween; a monitoring-area setting unit that sets, in the images acquired by the image acquisition unit, a monitoring area in a space in the second area adjacent to the boundary; an object detecting unit that detects a moving object in the monitoring area set by the monitoring-area setting unit by processing the images acquired by the image acquisition unit; and a controller that performs control so as to restrict the operation of the robot when the moving object is detected by the object detecting unit.

According to this aspect, when the robot operates in the first area and the moving object, such as an operator or a moving robot, operates in the second area, the monitoring-area setting unit sets, in the images of the first area and the second area in the vicinity of the boundary sequentially acquired by the image acquisition unit, a monitoring area in the second area. Then, when the moving object in the monitoring area is detected by the object detecting unit, the operation of the robot in the first area is restricted.

More specifically, because the entry of the moving object operating in the second area into the monitoring area before crossing the boundary is detected by the object detecting unit, setting a sufficiently large monitoring area makes it unnecessary to consider the safety distance in the first area. Furthermore, even if the robot's working space is set very close to the boundary, contact between the moving object and the robot can be reliably avoided. Thus, it is possible to minimize the installation area of the robot.

In the above-described aspect, the monitoring-area setting unit may set a monitoring area also in a space in the first area adjacent to the boundary, and the controller may perform control so as to restrict the operation of the robot located in the monitoring area set in the first area.

With this configuration, when the moving object enters the monitoring area in the second area adjacent to the boundary, the operation of the robot is restricted only when it is in the monitoring area in the first area adjacent to the boundary. In other words, when the robot is not in the monitoring area in the first area, the operation restriction is not performed, and thus, the robot can be efficiently operated.

Furthermore, in the above-described aspect, the monitoring-area setting unit may set the monitoring area based on the distance the moving object moves from when it is detected by the object detecting unit to when the operation restriction of the robot by the controller is completed.

With this configuration, it is possible to perform setting such that the moving object does not enter the first area across the boundary before the operation restriction of the robot by the controller, started the moment the entry of the moving object into the monitoring area is detected, is completed.

Furthermore, in the above aspect, the image acquisition unit may be a three-dimensional camera that acquires three-dimensional images.

With this configuration, it is possible to ascertain the three-dimensional position of the moving object or the like to set a proper monitoring area. For example, when a monitoring area is set by acquiring two-dimensional images, a monitoring area that is wider at a position farther from the image acquisition unit is generated due to the field-of-view angle. However, by acquiring three-dimensional images, it is possible to set a monitoring area having a uniform distance from the boundary, without depending on the distance from the image acquisition unit.

Furthermore, in the above aspect, the image acquisition unit may include a three-dimensional camera that acquires three-dimensional images, and the monitoring-area setting unit may set the monitoring area in the first area based on the distance the moving object moves from when it is detected by the object detecting unit to when the operation restriction of the robot by the controller is completed and based on the three-dimensional images acquired by the image acquisition unit.

When the monitoring area in the second area is set equal to the distance the moving object moves until the operation restriction of the robot is completed, if the moving object enters the monitoring area set in the second area, the position to which the moving object moves from the start to completion of the operation restriction of the robot extends into the first area across the boundary.

With this configuration, it is possible to set the space extending in the first area as the monitoring area in the first area, and, by restricting the operation of the robot only when the robot is in this monitoring area, the across-the-board operation restriction of the robot that is performed even when there is no possibility of contact is eliminated, and thus, the robot can be operated efficiently.

Furthermore, in the above aspect, the controller may perform control so as to slow down the robot in the monitoring area set in the first area when the moving object is detected by the object detecting unit.

With this configuration, by slowing down the robot to restrict the operation of the robot, it is possible to avoid contact of the robot with the moving object coming from the second area side across the boundary without stopping the robot.

The present invention provides an advantage in that, because there is no need to consider a safety distance in the installation of a robot, the installation area of the robot can be minimized.

The invention claimed is:

1. A robot system comprising:
   a robot installed such that the working space thereof is within a first area;

an image acquisition unit that sequentially acquires images of the vicinity of a boundary of the first area and a second area that are adjacent to each other with the boundary therebetween;

a monitoring-area setting unit that sets, in the images acquired by the image acquisition unit, a monitoring area in each of a space in the first area adjacent to the boundary and in a space in the second area adjacent to the boundary;

an object detecting unit that detects a moving object in the monitoring area in the second area set by the monitoring-area setting unit by processing the images acquired by the image acquisition unit; and a controller that performs control of the robot, wherein when the moving object is detected by the object detecting unit, the controller performs control so as to restrict an operation of the robot located in the monitoring area in the first area and not to restrict the operation of the robot not located in the monitoring area in the first area.

2. The robot system according to claim 1, wherein the monitoring-area setting unit sets the monitoring area in the first area based on a distance the moving object moves from when it is detected by the object detecting unit to when the operation restriction of the robot by the controller is completed.

3. The robot system according to claim 1, wherein the image acquisition unit is a three-dimensional camera that acquires three-dimensional images.

4. The robot system according to claim 1, wherein
the image acquisition unit comprises a three-dimensional camera that acquires three-dimensional images, and
the monitoring-area setting unit sets the monitoring area in the first area based on a distance the moving object moves from when it is detected by the object detecting unit to when the operation restriction of the robot by the controller is completed and based on the three-dimensional images acquired by the image acquisition unit.

5. The robot system according to claim 4, wherein the monitoring-area setting unit sets the monitoring area in the first area from the surface of the moving object in the monitoring area in the second area detected by the three-dimensional image acquisition unit to a position offset to the first area side by the distance the moving object moves.

6. The robot system according to claim 1, wherein the controller performs control so as to slow down the robot in the monitoring area set in the first area when the moving object is detected by the object detecting unit.

7. A robot system comprising:
a robot installed such that a working space thereof is within a first area;
a camera that sequentially acquires images of the vicinity of a boundary of the first area and a second area that are adjacent to each other with the boundary therebetween; and
a processor comprising hardware, the processor being configured to:
set, in the images acquired by the camera, a monitoring area in each of a space in the first area adjacent to the boundary and in a space in the second area adjacent to the boundary,
detect a moving object in the monitoring area in the set second area by processing the images acquired by the camera, and
in response to the moving object being detected, performing control so as to restrict an operation of the robot located in the monitoring area in the first area and not to restrict the operation of the robot not located in the monitoring area in the first area.

* * * * *